US006874322B2

(12) United States Patent
Schwarzott

(10) Patent No.: US 6,874,322 B2
(45) Date of Patent: Apr. 5, 2005

(54) METHOD FOR OPERATING A GAS AND STEAM TURBINE SYSTEM AND A CORRESPONDING SYSTEM

(75) Inventor: Werner Schwarzott, Grossenseebach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/381,847

(22) PCT Filed: Sep. 17, 2001

(86) PCT No.: PCT/EP01/10749

§ 371 (c)(1), (2), (4) Date: Mar. 28, 2003

(87) PCT Pub. No.: WO02/27154

PCT Pub. Date: Apr. 4, 2002

(65) Prior Publication Data

US 2004/0011049 A1 Jan. 22, 2004

(30) Foreign Application Priority Data

Sep. 29, 2000 (EP) ........................................... 00121502

(51) Int. Cl.[7] ................................................. F02C 6/18

(52) U.S. Cl. ...................................... 60/772; 60/39.182

(58) Field of Search .............................. 60/772, 39.182, 60/667; 122/7 R

(56) References Cited

U.S. PATENT DOCUMENTS

| | | | | | |
|---|---|---|---|---|---|
| 3,702,619 | A | | 11/1972 | Son | |
| 3,756,023 | A | * | 9/1973 | Berman | 60/667 |
| 4,799,461 | A | * | 1/1989 | Shigenaka et al. | 122/7 R |
| 4,869,595 | A | | 9/1989 | Lang | |
| 5,044,163 | A | * | 9/1991 | Bruckner et al. | 60/39.182 |
| 5,369,950 | A | * | 12/1994 | Bruckner et al. | 60/39.182 |
| 5,661,968 | A | * | 9/1997 | Gabriel | 60/39.182 |
| 6,041,588 | A | * | 3/2000 | Bruckner et al. | 60/39.182 |
| 6,363,710 | B1 | * | 4/2002 | Gebke et al. | 60/39.182 |

FOREIGN PATENT DOCUMENTS

| | | |
|---|---|---|
| DE | 19512466 | 8/1996 |
| EP | 0281151 | 9/1988 |

* cited by examiner

*Primary Examiner*—Michael Koczo
(74) *Attorney, Agent, or Firm*—Harness, Dickey & Pierce, P.L.C.

(57) ABSTRACT

In a method of operating a gas turbine and steam turbine installation with a gas turbine which can be operated with both gas and oil, a partial flow of heated feed water is injected into the cold condensate when a change is made from gas operation to oil operation. For this purpose, the installation comprises a mixing device, in which at least one spray head connected to a hot-water main, is arranged for the supply of the partial flow.

23 Claims, 2 Drawing Sheets

METHOD FOR OPERATING A GAS AND STEAM TURBINE SYSTEM AND A CORRESPONDING SYSTEM

This application is the national phase under 35 U.S.C. § 371 of PCT International Application No. PCT/EP01/10749 which has an International filing date of Sep. 17, 2001, which designated the United States of America and which claims priority on European Patent Application number EP 00121502.9 filed Sep. 29, 2000, the entire contents of which are hereby incorporated herein by reference.

FIELD OF THE INVENTION

The invention generally relates to a method of operating a gas turbine and steam turbine installation or system. In one embodiment, it relates to a method in which the exhaust gas emerging from a gas turbine, which can be operated with both gas and oil, is routed via a waste-heat steam generator whose heating surfaces are connected into the water/steam cycle of a steam turbine having a number of pressure stages. Condensate preheated in the waste-heat steam generator is heated by feed water at a pressure which is high relative to the condensate and is supplied as steam to the steam turbine.

BACKGROUND OF THE INVENTION

In a gas turbine and steam turbine installation or system, the heat contained in the expanded working fluid or exhaust gas from the gas turbine is used for generating steam for the steam turbine connected into the water/steam cycle. In this arrangement, the heat transmission takes place in a waste-heat steam generator or boiler which is connected downstream of the gas turbine and in which heating surfaces are arranged in the form of tubes or tube bundles. The latter are in turn connected into the water/steam cycle of the steam turbine. In this arrangement, the water/steam cycle usually includes a plurality of pressure stages, for example two or three pressure stages, with a preheater, an evaporator and a superheater being provided as heating surfaces in each pressure stage. Such a gas turbine and steam turbine installation is, for example, known from EP 0 523 467 B1.

In this arrangement, the total water quantity routed within the water/steam cycle is dimensioned in such a way that, because of the heat transmission, the exhaust gas leaving the waste-heat steam generator is cooled to a temperature of approximately 70° C. to 100° C. In particular, this indicates that the heating surfaces exposed to the hot exhaust gas and pressure drums provided for water/steam separation are designed for full-load operation or rated operation, at which an installation efficiency of approximately 55% to 60% is currently achieved. For thermodynamic reasons, an attempt is then also made to ensure that the temperatures of the feed water routed within the individual heating surfaces and at different pressures are as close as possible to the temperature variation of the exhaust gas, which is being cooled along the waste-heat steam generator as a consequence of the heat exchange. The objective is then to keep the temperature difference between the feed water routed over the individual heating surfaces and the exhaust gas as small as possible in each region of the waste-heat steam generator. In order to transfer, in this process, the highest possible proportion of the heat quantity contained in the exhaust gas, a condensate preheater is additionally provided in the waste-heat steam generator in order to heat condensed water from the steam turbine.

The gas turbine of such a gas turbine and steam turbine installation can be designed for operation with different fuels. If the gas turbine is designed for heating oil and natural gas, the heating oil is only provided as the gas turbine fuel for a short operation duration, for example for between 100 and 500 hours per annum, as so-called back-up for the natural gas. In this arrangement, the gas turbine and steam turbine installation is usually designed and optimized, as a priority, for natural gas operation of the gas turbine. The necessary heat can be extracted in various ways from the waste-heat steam generator itself in order then to ensure a sufficiently high inlet temperature of the condensate flowing into the waste-heat steam generator in the case of heating oil operation, particularly in the case of a change from gas operation to oil operation.

One possibility resides in completely or partially bypassing the condensate preheater and heating the condensate, in a feed-water tank connected into the water/steam cycle, by supplying low-pressure steam. At low steam pressures, however, such a method requires a large-volume, and under certain circumstances multistage, heating-steam system in the feed-water tank which, in the case of large heating ranges, can endanger a degassing system which is usually located in the feed-water tank.

In order, in particular, to ensure effective degassing of the condensate, the condensate temperature in the feed-water tank is usually kept within a temperature range between 130° C. and 160° C. For this purpose, the condensate is usually preheated by a preheater fed with low-pressure steam or hot water from an economizer, so that the heating range of the condensate in the feed-water tank is kept as small as possible. Particularly in the case of two-pressure or three-pressure installations, extraction of hot water from the high-pressure economizer is then necessary in order to make sufficient heat available. Particularly in the case of three-pressure installations or circuits, however, this has the substantial disadvantage that an additional, external condensate preheater is required which must be designed for the high pressures and high temperatures and/or high temperature differences. This method is therefore extremely undesirable simply because of the substantial costs and the additional space requirements for the condensate preheater.

In the case of oil operation of the gas turbine, it is also possible to undertake or support the condensate heating in the feed-water tank or in the degasser with a partial flow of steam supplied from a reheater. This method, however, is not applicable either, particularly in the case of modern installation circuits without feed-water tank or without degasser, particularly since corresponding appliances or apparatus for mixed preheating are lacking.

A method which can be carried out with less equipment and operational complexity, as compared with the methods described, is known from DE 187 36 889 C1. This method is based on a displacement of exhaust gas heat in the direction of condensate preheating as a consequence of a reduction in the low-pressure region and of an installation of bypasses on the water side of the economizer. This method, however, also meets realization limits in the case of certain requirements.

SUMMARY OF THE INVENTION

An embodiment of the invention is based on an object of providing a method of operating a gas turbine and steam turbine installation. The method ensures a change from gas operation to oil operation of the gas turbine while covering a wide range of the inlet temperature of the condensate flowing into the waste-heat steam generator, in an effective and, with respect to the installation efficiency, favorable manner with, at the same time, small equipment requirements and little operational complexity. In addition, a gas turbine and steam turbine installation suitable for carrying out the method is to be provided.

With respect to the method, an embodiment of the invention achieves the object. For this purpose, provision is made for feed water at a high pressure relative to the condensate and at a high temperature relative to the condensate being admixed by use of a pipework main to the cold condensate—without heat exchanger and therefore directly—so that, in the case of a change from gas operation to oil operation, a partial flow of heated feed water is injected into the cold condensate and is, by this, admixed with the latter.

An embodiment of the invention is based on the consideration that it is possible to dispense with an additional heat exchanger, which would have to cool the heated feed water or hot water extracted from the water/steam cycle to the temperature level of the condensate system before its pressure reduction, if a specified evaporation of the hot water and a subsequent condensation of the water/steam mixture which is formed takes place due to the injection of the hot water into the cold condensate. By this, the occurrence of steam, i.e. steam formation, can be permitted, which steam formation in connection with the pressure reduction is to be prevented by the employment of the additional heat exchanger.

In this arrangement and particularly in the case of a three-pressure system, it is possible to extract heated feed water from the medium-pressure system, from the high-pressure system or from both systems. The extraction then essentially depends on the amount of heat required for the condensate and on the installation efficiency which has to be maintained, as a minimum, in the case of exclusively back-up oil operation of the gas turbine.

In the case of a two-pressure system, i.e. in the case of a two-pressure installation, the heated feed water or hot water is expediently extracted from a high-pressure drum and, in the case of a three-pressure system or in the case of a three-pressure installation, from the high-pressure drum and/or from a medium-pressure drum as a feed water partial flow. As an alternative, the extraction of the partial flow can also take place at the outlet of the high-pressure economizer or of the medium-pressure economizer.

If required, the pressure of the low-pressure system can be additionally raised in order to displace heat contained in the exhaust gas from the low-pressure system toward the condensate preheater arranged downstream of the low-pressure system on the exhaust gas side. In this arrangement, it is essential that the heated feed water extracted at a suitable position from the water/steam cycle in the form of a feed-water partial flow without preliminary heating, i.e. without heat exchange, should be admixed to the cold condensate in an additional heat exchanger.

In order to admix from the partial flow of heated feed water to the cold condensate without a heat exchanger in the case of a change from gas operation to oil operation, the installation comprises a mixing device by which cold condensate is supplied to a condensate preheater arranged as a heating surface in the waste-heat steam generator. At least one spray head, to which heated feed water or hot water extracted from the water/steam cycle can be supplied via a hot water main, is arranged in the internal space of the mixing device through which the condensate flows.

In order to avoid unallowable or undesirable condensation shocks—so-called water hammer—when injecting the heated feed water or hot water, the hot water under pressure in the hot water main, i.e. the partial flow of heated feed water, is first caused to flow by opening a valve connected upstream of the spray head or of each spray head. The resulting differential pressure, at a preferably spring-loaded valve cone of a valve provided in the spray head, between the partial flow and the condensate routed via the mixing device raises the valve cone from the valve seat so that water flows through various holes or valve ducts to a number of spray nozzles. The flow through the narrow valve ducts and spray nozzles leads to an increasing reduction in pressure.

When the boiling conditions in the region of the spray nozzles are exceeded, some of the hot water is evaporated. In consequence, the resultant mixture is finely distributed and the remaining hot water is cooled by evaporation. Due to the injection and the very intimate mixture with the surrounding cold condensate, the small steam bubbles occurring are recondensed and, together with the hot water, are brought to a mixed temperature which is below the boiling temperature prevailing at this pressure. Depending on the necessary quantity of hot water and the temperature, a corresponding number of spray heads are provided which are then arranged in a correspondingly extended pipework piece of a hot water mixer, designed as a pipework main, of the mixing device.

In such an embodiment of the spray head or of each spray head, the steam formed by the introduction of the hot water, and due to its evaporation, is distributed among particularly many small openings of the respective spray head. These openings are located within the mixing device below the condensate level. In consequence, only small steam bubbles occur in the water bath formed by the condensate.

The advantages achieved by embodiments of the invention reside particularly in the fact that a water inlet temperature into the waste-heat steam generator, which temperature—necessary in the case of oil operation of the gas turbine—is increased relative to gas operation of the gas turbine, can be adjusted—using particularly simple devices and even without additional heat exchanger or external condensate preheater—by injection, without heat exchanger, of feed water at high pressure into the cold condensate. With this arrangement and suitably configured spray heads arranged within a mixing device provided for this purpose, a mixing temperature, which is located below the boiling temperature of the preheated condensate or condensate to be preheated, of the partial flow mixed with the cold condensate can be produced during oil operation in a particularly simple and effective manner. Because, furthermore, the throughput in the condensate preheater is correspondingly increased by use of the recirculated feed water, it is possible to dispense with previously necessary condensate circulating pumps. In particular, it is possible to cover a wide temperature range of the steam generator or boiler inlet temperature without circuit modification.

As is known, the capacity reserves of the high-pressure feed-water pump can also be utilized in this way because smaller delivery quantities also are usually necessary during oil operation, as compared with gas operation, because of a smaller gas turbine power. In addition, no admixture of cold feed water is necessary so that only a small delivery quantity of feed water is necessary to generate the corresponding inlet temperature. Because of the operating range, which is extended by circuit technology means in a particularly effective manner, standardization is also possible. The investment costs are, furthermore, particularly small.

Because of the relatively less complex control and switching systems, a relatively simple mode of operation is, on the one hand, achieved and, in addition, a relatively high level of reliability also. This is because fewer active components are necessary overall. Because of the relatively small number of components, the maintenance requirements and the spare parts holdings are also advantageously reduced.

BRIEF DESCRIPTION OF THE DRAWINGS

An embodiment example of the invention is explained in more detail below by means of the drawings, in which.

Mutually corresponding parts are provided with the same designations in all figures.

DETAILED DESCRIPTION OF THE PREFERRED EMBODIMENTS

Figure 1:
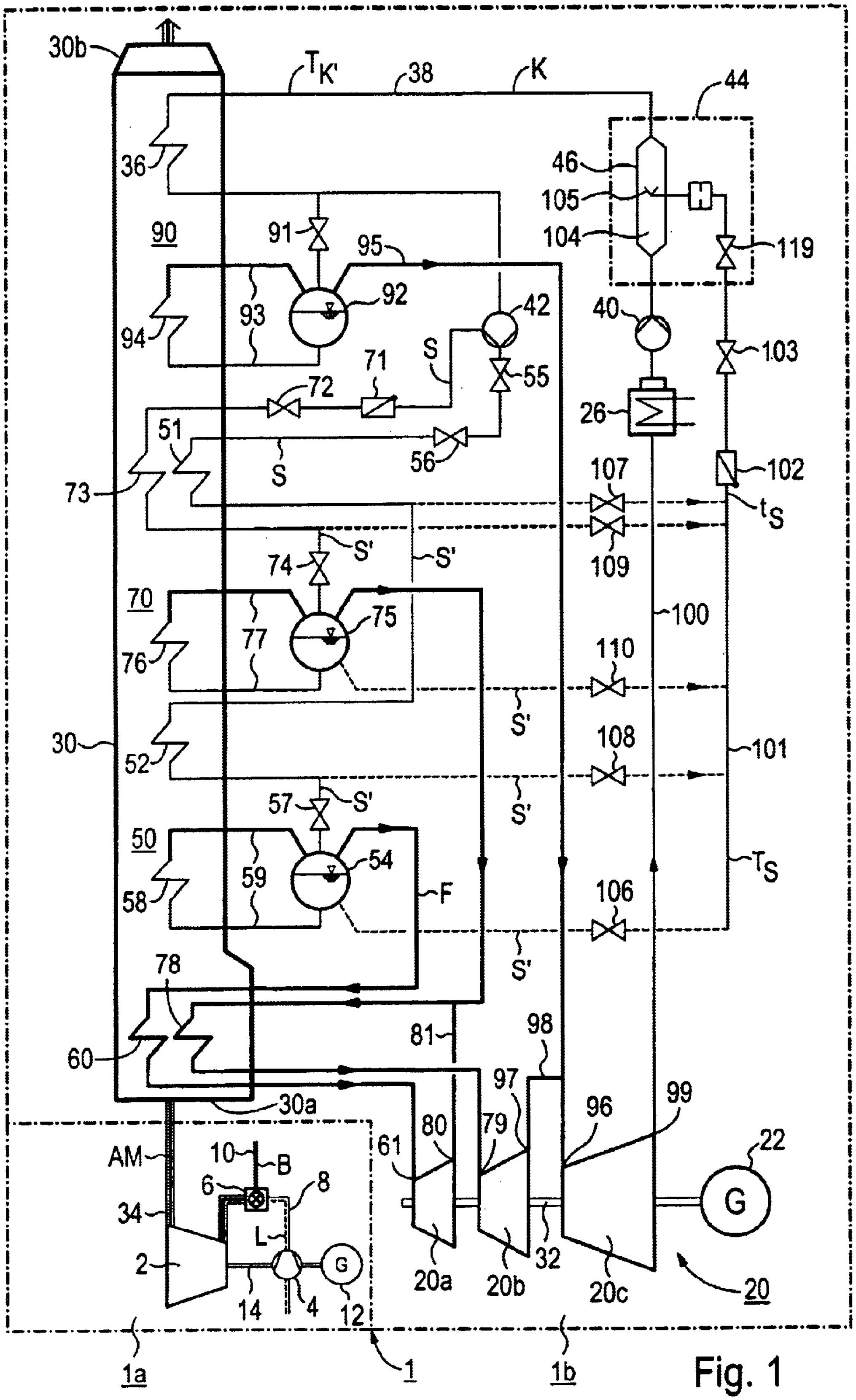
FIG. 1 shows, diagrammatically, a gas turbine and steam turbine installation, with a hot-water mixing device, designed for a change from gas operation to oil operation.

The gas turbine and steam turbine installation 1 shown in the figure includes a gas turbine installation 1*a* and a steam turbine installation 1*b*. The gas turbine installation 1*a* includes a gas turbine 2 with connected air compressor 4 and, connected upstream of the gas turbine 2, a combustion chamber 6, which is connected to a fresh air main 8 of the air compressor 4. A fuel main 10, by which the combustion chamber 6 can be optionally supplied with gas or oil as the fuel B, opens into the combustion chamber 6. This fuel B is burnt, with the supply of compressed air L, to form working fluid or combustion gas for the gas turbine 2. The gas turbine 2 and the air compressor 4, together with a generator 12, are seated on a common turbine shaft 14.

The steam turbine installation 1*b* comprises a steam turbine 20 with connected generator 22 and, in a water/steam cycle 24, a condenser 26 and a waste-heat steam generator 30 connected downstream of the steam turbine 20. The steam turbine 20 has a first pressure stage or a high-pressure part 20*a*, a second pressure stage or a medium-pressure part 20*b* and a third pressure stage or a low-pressure part 20*c*, which drive the generator 22 by means of a common turbine shaft 32.

In order to supply working fluid expanded in the gas turbine 2, or exhaust gas AM, into the waste-heat steam generator 30, an exhaust gas main 34 is connected to an inlet 30*a* of the waste-heat steam generator 30. The exhaust gas AM from the gas turbine 2 cools along the waste-heat steam generator 30 as a consequence of indirect heat exchange with condensate K and feed water S routed in the water/steam cycle 24 and leaves the waste-heat steam generator 30 via its outlet 30*b* in the direction of a chimney (not shown).

The waste-heat steam generator 30 includes, as heating surfaces, a condensate preheater 36 which is fed at its inlet end with condensate K from the condenser 26 by a condensate main 38, into which is connected a condensate pump 40. The condensate preheater 36 is routed at its outlet end to the suction side of a feed-water pump 42. A mixing device 44 with a tubular hot-water mixer 46 is connected into the condensate main 38.

The feed-water pump 42 is configured as a high-pressure feed pump with medium-pressure extraction. It brings the condensate K to a pressure level, of approximately 120 bar to 150 bar, suitable for a high-pressure stage 50, of the water/steam cycle 24, associated with the high-pressure part 20*a* of the steam turbine 20. By way of the medium-pressure extraction, the condensate K is changed by the feed-water pump 42 to a pressure level, of approximately 40 bar to 60 bar, suitable for a medium-pressure stage 70 associated with the medium-pressure part 20*b* of the steam turbine 20.

Some of the condensate K routed via the feed-water pump 42, which condensate K is designated as feed water S on the delivery side of the feed-water pump 42, is supplied at high-pressure to a first high-pressure economizer 51 or feed water preheater and through this to a second high-pressure economizer 52. At its outlet end, the latter is connected, via a valve 57, to a high-pressure drum 54.

Some of the feed water S is, furthermore, supplied at medium pressure via a non-return valve 71 and a valve 72 connected downstream of it to a feed-water preheater or medium-pressure economizer 73. At its outlet end, the latter is connected, via a valve 74, to a medium-pressure drum 75. In an analogous manner, the condensate preheater 36, as part of a low-pressure stage 90 of the water/steam cycle 24 associated with the low-pressure part 20*c* of the steam turbine 20, is connected at its outlet, via a valve 91, to a low-pressure drum 92.

The medium-pressure drum 75 is connected to a medium-pressure evaporator 76, which is arranged in the waste-heat steam generator 30, to form a water/steam circuit 77. At the steam end, a reheater 78 is connected to the medium-pressure drum 75, which reheater 78 is routed at the outlet end (hot reheat) to an inlet 79 of the medium-pressure part 20*b* and an exhaust steam main 81 connected to an outlet 80 of the high-pressure part 20*a* of the steam turbine 20 is routed into the inlet end (cold reheat).

At the high-pressure end, the feed-water pump 42 is routed via two valves 55, 56 and via the first high-pressure economizer 51 and the second high-pressure economizer 52 connected downstream of the first high-pressure economizer 51 at the feed-water end and arranged upstream on the exhaust gas side within the waste-heat steam generator 30, and via a further valve 57, provided if required, to the high-pressure drum 54. The latter is in turn connected to a high-pressure evaporator 58 arranged in the waste-heat steam generator 30 to form a water/steam circuit 59. For removal of live steam F, the high-pressure drum 54 is connected to a high-pressure superheater 60 arranged in the waste-heat steam generator 30, which high-pressure superheater 60 is connected at its outlet end to an inlet 61 of the high-pressure part 20*a* of the steam turbine 20.

The high-pressure economizers 51, 52, the high-pressure evaporator 58 and the high-pressure superheater 59 form, together with the high-pressure part 20*a*, the high-pressure stage 50 of the water/steam cycle 24. The medium-pressure evaporator 76 and the reheater 78 form, together with the medium-pressure part 20*b*, the medium-pressure stage 70 of the water/steam cycle 24. In an analogous manner, a low-pressure evaporator 94 arranged in the waste-heat steam generator 30 and connected to the low-pressure drum 92 to form a water/steam circuit 93, together with the low-pressure part 20*c* of the steam turbine 20, form the low-pressure stage 90 of the water/steam cycle 24. For this purpose, the low-pressure drum 92 is connected at the steam end to an inlet 96 of the low-pressure part 20*c* by a steam main 95. An overflow main 98 connected to an outlet 97 of the medium-pressure part 20*b* opens into the steam main 95. An outlet 99 of the low-pressure part 20*c* is connected to the condenser 26 by means of a steam main 100.

The gas turbine 2 of the gas turbine and steam turbine installation 1 can be operated with both natural gas and heating oil as the fuel B. In the case of gas operation of the gas turbine 2, the working fluid or exhaust gas AM supplied to the waste-heat steam generator 30 has a relatively high level of purity, the water/steam cycle 24 and the installation components being designed for this operating condition and optimized with respect to the efficiency.

When the gas turbine 2 is changed from gas operation to oil operation, a partial flow tS of heated feed water S', which can be adjusted by a valve 102 with non-return valve 103 connected upstream, is supplied via a partial flow or hot water main 101 to the mixing device 44, 46 and is admixed to the cold condensate K in the internal space 104 by means of a spray-head arrangement 105. The partial flow tS of heated feed water S' is extracted at the water end via a valve 106, preferably from the high-pressure drum 54. As an alternative, the heated feed water S' can also be extracted as an adjustable partial flow tS via a valve 107 from the first high-pressure economizer 51 or, via a valve 108, from the second high-pressure economizer 52 at the outlet end.

As an alternative, or additionally, in the case of the three-pressure system shown, heated feed water S' can also be taken as the adjustable partial flow tS from the medium-pressure economizer 73 at the outlet end via a valve 109 or from the medium-pressure drum 75 at the water end via a valve 110.

The admixture of the partial flow tS to the condensate K by injection of the heated feed water S', which is routed via the hot water main 101, into the cold condensate K leads to specified evaporation and subsequent condensation of the water/steam mixture forming in the process in the mixing device 44, 46. The temperature TS of the partial flow tS on its extraction as heated feed water S' from the high-pressure drum 54 is then, for example, 320° C. A mixed temperature which is below the boiling temperature prevailing at this pressure in the mixing device 44, 46 can be adjusted within this mixing appliance 44, 46 by the injection of the partial flow tS and by its intimate mixing with the cold condensate K—given corresponding adjustment of the quantity of the partial flow tS by the valve 103.

Figure 2:
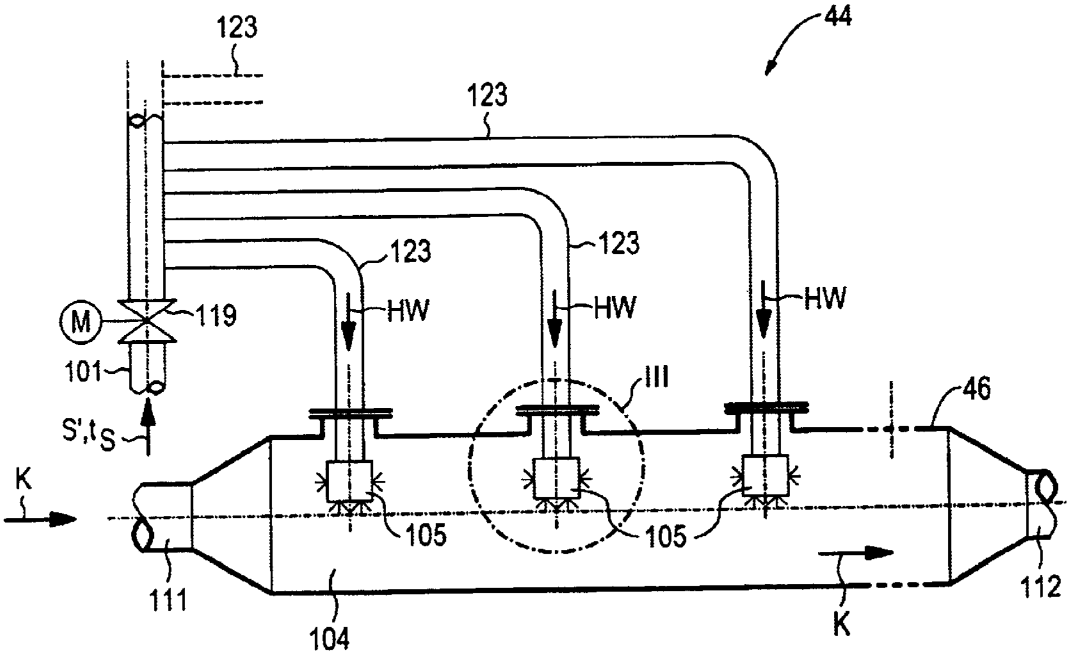
FIG. 2 shows the mixing device of FIG. 1 to a larger scale with a number of spray heads.

FIG. 2 shows a preferred embodiment of the mixing device 44 or of the hot-water mixer 46. The latter has an inlet opening 111 connected to the condensate main 38 for supplying the cold condensate K into the mixing device 44 and an outlet opening 112, by means of which the mixing device 44 is connected to the inlet end of the condensate preheater 36. The tubular hot-water mixer 46 of the mixing device 44 is therefore connected into the condensate main 38. In the embodiment example, three spray heads 105 are arranged in the internal space 104 of the mixing device 44. A larger or smaller number of such spray heads 105 can be provided within the hot-water mixer 46 as a function of the necessary hot; water quantity and temperature.

Figure 3:
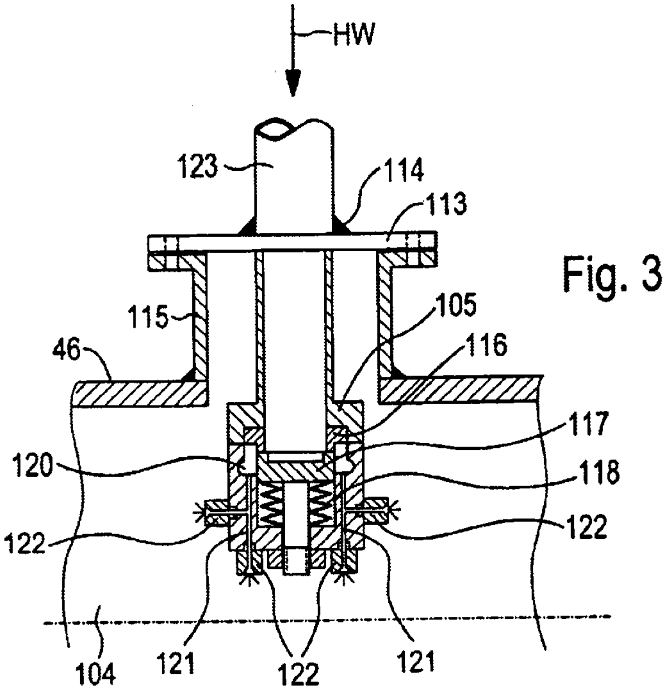
FIG. 3 shows an excerpt III from FIG. 2 to a larger scale with a spray head which has a valve.

As is clearly visible as a comparison in FIG. 3, the respective spray head 105 is routed by an installation flange 113, with welded-on end 114, through a flange opening 115 into the internal space 104 of the hot-water mixer 46 and is respectively held in the desired position. The spray head 105 is configured so that it is self-opening and has, for this purpose, a valve formed by a valve seat 116 and a valve cone 117. In this arrangement, the valve cone 117 is' routed so that it seals against the valve seat 116 in the closed position of the valve as a consequence of the spring force of a spring pack 118.

When the gas turbine 2 is changed from gas operation to oil operation, the hot water under pressure in the hot-water main 101, or heated feed water S'—i.e. the adjusted partial flow tS—is made to flow by opening a shut-off valve 119 (FIG. 2) connected upstream of the spray head 105 or each spray head. The differential pressure present at a spring-loaded valve cone 117 lifts the latter automatically from the valve seat 116. Because of this, heated feed, water S', designated below as hot water HW, flows via an annular space 120 provided in the region of the valve seat 117 and through holes or valve ducts 121 connected to it to a number of spray nozzles 122. In this arrangement, between four and six spray nozzles 102 are preferably distributed at the periphery of the spray head 105.

The flow of the hot water HW through the narrow holes or valve ducts 121 and spray nozzles 122 leads to an increasing reduction in pressure. When the boiling conditions are exceeded in the region of the spray nozzles 122, some of the hot water HW is evaporated and, in consequence, the resulting mixture is finely distributed. In addition, the remaining hot water HW is cooled by evaporation. Due to the injection of the partial flow tS of heated feed water S' or hot water HW and the effective mixing with the cold condensate K surrounding the spray heads 105 in the internal space 104 of the mixing device 44, small steam bubbles which appear are recondensed and, together with the hot water HW, are brought to a mixed temperature which is below the boiling temperature prevailing at this pressure.

The spray heads 105 are respectively connected, by a supply or intermediate main 123, to the hot-water main 101 on the downstream end of the shut-off valve 119. Depending on the number of spray heads 105 provided or necessary, therefore, a corresponding number of intermediate mains 123 can be connected to the hot-water main 101. In consequence, both the design and the manufacturing or assembly complexity is particularly small in the respective layout of the mixing device 44, 46.

Due to the admixture of hot water S' to the cold condensate K caused as a consequence of the injection of the feed water partial flow tS into the hot-water mixer 46, a water temperature or boiler inlet temperature TK', necessary during oil operation of the gas turbine 2 and increased relative to gas operation—of between 120 and 130° C., for example can be adjusted with particularly simple devices and, in particular, without the intermediate connection of an additional heat exchanger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of operating a gas turbine and steam turbine installation, comprising:

routing exhaust gas emerging from a gas turbine, operable with both gas and oil, via a waste-heat steam generator whose heating surfaces are connected into the water/steam cycle of a steam turbine having a plurality of pressure stages; and preheating condensate in the waste-heat steam generator by feed water, which is at a pressure that is high relative to the condensate and which is supplied as steam to the steam turbine, wherein, in the case of a change from gas operation to oil operation, a partial flow of heated feed water is injected through at least one spray head into the cold condensate.

2. The method as claimed in claim 1, wherein the partial flow is extracted from at least one of a relatively high-pressure stage and a relatively low-pressure stage of the water/steam cycle.

3. The method as claimed in claim 1, wherein the partial flow is extracted from the outlet end of at least one of a relatively high-pressure economizer and a relatively low-pressure economizer provided as a heating surface in the waste-heat steam generator.

4. The method as claimed in claim 1, wherein the partial flow is extracted from at least one of a relatively high-pressure drum and a relatively low-pressure drum connected into the water/steam cycle.

5. A gas turbine and steam turbine installation, comprising:

a gas turbine, adapted to operate with both gas and oil;

a waste-heat steam generator connected downstream of the exhaust-gas end of the gas turbine, wherein heating surfaces of the waste-heat steam generator are connected into a water/steam cycle of a steam turbine, the steam turbine including, at least one low-pressure stage, one high-pressure stage, a mixing device having an internal space, an inlet opening connected to a condensate main for supplying cold condensate, an outlet opening connected at the inlet end to a condensate preheater arranged as a heating surface in the waste-heat steam generator and at least one spray head arranged within the internal space, wherein the spray head is adapted to be supplied with an adjustable partial flow of heated feed water, extracted from at least one of a pressure drum and an economizer, by a hot water main connected at the outlet end to the spray head and routed at the supply end to a pressure drum connected at least one of'at the water end into the water/steam cycle, and at the outlet end to an economizer, arranged as a heating surface in the waste-heat steam generator.

6. The gas turbine and steam turbine installation as claimed in claim 5, wherein a valve for adjusting the partial flow is connected into the hot water main upstream of the mixing device, in the flow direction of the partial flow.

7. The gas turbine and steam turbine installation as claimed in claim 5, wherein a plurality of spray heads are connected by an intermediate main to the hot water main.

8. The gas turbine and steam turbine installation as claimed in claim 7, wherein a shut-off valve is connected into the hot water main upstream of at least one of the intermediate main, and each intermediate main, in the flow direction of the partial flow.

9. The gas turbine and steam turbine installation as claimed in claim 5, wherein each spray head includes a valve which is self-opening as a function of the pressure difference between the partial flow and the cold condensate.

10. The gas turbine and steam turbine installation as claimed in claim 7, wherein the valve is connected to at least one spray nozzle of the spray head via at least one valve duct.

11. The method as claimed in claim 2, wherein the partial flow is extracted from the outlet end of at least one of a relatively high-pressure economizer and a relatively low-pressure economizer provided as a heating surface in the waste-heat steam generator.

12. The gas turbine and steam turbine installation as claimed in claim 5, wherein a plurality of spray heads are connected by an intermediate main to the hot water main.

13. The gas turbine and steam turbine installation as claimed in claim 6, wherein each spray head includes a valve which is self-opening as a function of the pressure difference between the partial flow and the cold condensate.

14. The gas turbine and steam turbine installation as claimed in claim 7, wherein each spray head includes a valve which is self-opening as a function of the pressure difference between the partial flow and the cold condensate.

15. The gas turbine and steam turbine installation as claimed in claim 8, wherein each spray head includes a valve which is self-opening as a function of the pressure difference between the partial flow and the cold condensate.

16. A steam turbine for a gas turbine and steam turbine installation, wherein the gas turbine is adapted to operate with both gas and oil, comprising:

at least one relatively low-pressure stage, at least one relatively high-pressure stage, and a mixing device, the mixing device including, an internal space, an inlet opening connected to a condensate main for supplying cold condensate, an outlet opening connected at the inlet end to a condensate preheater arranged as a heating surface in a waste-heat steam generator connected downstream of the exhaust-gas end of the gas turbine, and at least one spray head arranged within the internal space, wherein the spray head is adapted to be supplied with an adjustable partial flow of heated feed water, for injection into a cold condensate.

17. The steam turbine of claim 16, wherein the partial flow is extracted from at least one of the pressure drum and the economizer.

18. The steam turbine of claim 16, wherein the partial flow is extracted by a hot water main connected at the outlet end to the spray head and routed at the supply end to a pressure drum connected at least one of at the water end into a water/steam cycle, and at the outlet end to an economizer, arranged as a heating surface in the waste-heat steam generator.

19. A method of operating a gas turbine and steam turbine installation, comprising:

routing exhaust gas emerging from a gas turbine, operable with both gas and oil, via a waste-heat steam generator having heating surfaces that are connected into the water/steam cycle of a steam turbine; and preheating condensate in the waste-heat steam generator by feed water, which is at a pressure which that is high relative to the condensate, wherein, in the case of a change from gas operation to oil operation, a partial flow of heated feed water is injected through at least one spray head into the cold condensate.

20. The method as claimed in claim 19, wherein the partial flow is extracted from at least one of a relatively high-pressure stage and a relatively low-pressure stage of the water/steam cycle.

21. The method as claimed in claim 19, wherein the partial flow is extracted from the outlet end of at least one of a relatively high-pressure economizer and a relatively low-pressure economizer provided as a heating surface in the waste-heat steam generator.

22. The method as claimed in claim 19, wherein the partial flow is extracted from at least one of a relatively high-pressure drum and a relatively low-pressure drum connected into the water/steam cycle.

23. A method of operating a gas turbine and steam turbine installation, comprising;

routing exhaust gas from a first turbine via a waste-heat steam generator;

heating condensate in the waste-heat steam generator to produce a feed water that is supplied to a second turbine; and spraying a portion of the feed water into the condensate.

* * * * *